United States Patent [19]
Liebermann et al.

[11] 3,793,584
[45] Feb. 19, 1974

[54] IGNITION SYSTEM TEST INSTRUMENT AND METHOD

[75] Inventors: Leonard N. Liebermann, La Jolla; Stanley H. Lai, San Diego, both of Calif.

[73] Assignee: TIF Instruments, Inc., Miami, Fla.

[22] Filed: Mar. 16, 1971

[21] Appl. No.: 124,677

[52] U.S. Cl. .......................... 324/16 R, 324/73 R
[51] Int. Cl. ................................................ G01m 15/00
[58] Field of Search.... 324/15, 16, 16 S, 73; 324/17, 324/18; 73/116–118

[56] References Cited
UNITED STATES PATENTS

| | | | |
|---|---|---|---|
| 3,572,103 | 3/1971 | Marino | 324/16 |
| 3,551,800 | 12/1970 | Widmer | 324/15 |
| 3,369,175 | 2/1968 | Morris | 324/122 |
| 3,548,300 | 12/1970 | Nolting | 324/15 |
| 2,728,888 | 12/1955 | Ellison | 324/16 R |
| 2,907,948 | 10/1959 | Sackett | 324/16 R |
| 3,238,771 | 3/1966 | Myrtetus | 324/16 S |
| 2,941,396 | 6/1960 | Adams | 324/16 S |
| 3,383,592 | 5/1968 | Williamson | 324/15 |
| 2,740,069 | 3/1956 | Minto | 324/16 S |
| 3,255,352 | 6/1966 | Johnston | 250/83.6 R |

Primary Examiner—Michael J. Lynch
Attorney, Agent, or Firm—Pennie & Edmonds

[57] ABSTRACT

An instrument and method are disclosed for testing an internal combustion engine ignition system to determine that the spark plugs, cables, coil, and other ignition system components are operating properly and for pinpointing sources of ignition system malfunction. The firing voltage, spark intensity and leakage are tested with respect to each spark plug, and the results indicated on an easily readable meter, without the necessity for an oscillosocpe. In a preferred embodiment, a non-ohmic probe is employed to obtain the spark plug signals, making it unnecessary to disconnect the spark plug leads for test purposes or to employ an ohmic ground connection.

16 Claims, 5 Drawing Figures

PATENTED FEB 19 1974 3,793,584

INVENTORS
LEONARD N. LIEBERMANN
STANLEY H. LAI
BY Pennie, Edmonds,
Morton, Taylor, & Adams

ATTORNEYS

IGNITION SYSTEM TEST INSTRUMENT AND METHOD

BACKGROUND OF THE INVENTION

1. Field of the Invention

This invention relates to an ignition system test instrument and method for measuring the performance of an internal combustion engine ignition system. In a preferred embodiment of the invention, the instrument requires no ohmic connection with the spark plugs being tested. The term "ohmic connection" as used herein refers to a direct wire connection such as by metal probe or clamp, as employed in conventional measurement instruments.

2. Description of the Prior Art

Heretofore, it has been common practice in measuring ignition system performance and diagnosing ignition system problems to employ an oscilloscope, permitting visual examination of the actual voltage waveform applied to each spark plug. A complete spark waveform has a duration of about one millisecond, necessitating the use of a high quality oscilloscope for adequate presentation of the waveform. A high voltage display tube is necessary to permit examination of the waveform under lighting conditions found in most garages, requiring expensive safety features to avoid hazards to personnel from shock and X-rays.

Generally, several discrete characteristics of the spark waveform are examined on the oscilloscope display. These are the firing voltage, or the voltage required to fire the spark plug; the spark discharge characteristic and the oscillatory or ringing characteristic, i.e., the degree of damping caused by any unwanted resistance or capacitance low impedance paths to ground. These tests are made by examining various parts of the spark waveform appearing on the oscilloscope, shown in FIG. 1, requiring substantial training in analyzing such waveforms on the part of the operator. Even so, certain compromises must be made in view of the way in which the waveform is presented on the oscilloscope. It is difficult at best to accurately ascertain the peak voltage from the trace and impossible to ascertain the average peak voltage, which is a better indication of the firing voltage characteristic of the system. The particular spark discharge characteristic read from the oscilloscope is the increasing or decreasing slope of the horizonal line in the spark discharge region, which provides only a qualitative, but not quantitative indication of firing performance. Coil or condenser leakage, ascertained from Region C of the waveform of FIG. 1 is only roughly measured by estimating the number of cycles in the waveform. Although this is a highly inexact way to measure the degree of damping (or decay) exhibited by the waveform, the oscilloscope does not permit more accurate measurement of it.

In addition to these compromises which are made in reading the oscilloscope, the ohmic connection required between it, a spark plug and the coil necessitates disconnecting the ignition leads, a troublesome procedure on a hot engine, particularly where the leads are not readily accessible. Also, disconnecting ignition leads often causes internal wire breakage. Additionally, oscilloscopes are large and usually relatively permanent installations requiring line voltage supplies; these characteristics as well as the above mentioned problems associated with connecting and reading them render them unsuitable for road use in particular.

SUMMARY OF THE INVENTION

In accordance with the invention, an ignition system test instrument and method are provided for testing an ignition system and for diagnosing specific system defects so that repair can be effected. The instrument operates at low voltage, as opposed to the high voltage required for an oscilloscope, and a simply read output meter directly indicates system performance. All problems connected with reading and interpreting an oscilloscope trace are eliminated. Advantageously, average readings are obtained directly. In a preferred embodiment of the invention, connection between the instrument and the ignition leads of the system being tested is effected by a non-ohmic probe, making it unnecessary to disconnect the leads for test purposes. Additionally, no ohmic ground connection is required by virtue of a quasi-ground terminal provided on the instrument. Unlike an oscilloscope, the instrument is inexpensive and highly portable, requiring no special training to operate.

In accordance with the invention, the ignition system test instrument is capable of analyzing three characteristics of the voltage applied to the spark plugs: the peak voltage characteristic, the spark discharge characteristic, and the oscillatory characteristic, all illustrated in the waveform of FIG. 1. The peak voltage (Region A) is that voltage necessary to initiate a spark discharge across the electrode gap of the spark plug. If this voltage is high, it imposes undue strain on the ignition system due to the greater output power required. Unduly high firing voltage is generally referred to as "hard sparking", leading to poor engine performance. It may be caused by worn or pitted electrodes, a coating of oil or other substance on electrode surfaces, or too wide a spark gap. It can also be caused by the existence of an additional spark gap in series with that of the plug electrodes, such as a break in the cable or unwanted gap between the distributor contacts.

The spark discharge characteristic B in FIG. 1 is that portion of the waveform during which the plug actually fires, sustaining a spark between its electrodes. An intense or "hot" spark is necessary for complete combustion. A weak spark may be caused by certain defects in the ignition system, such as high cable resistance or a low impedance shunt to ground. If poor spark intensity is found for all cylinders, this usually is indicative of a defect in the coil, coil cable, or rotor. It has been found that the discharge voltage is not a satisfactory indicator of spark intensity, for it is primarily determined by the condition of the spark plug electrodes and not by other characteristics of the ignition. The slope of the discharge characteristic is a crude indicator of spark intensity, but since the slope is not linear, it is difficult to quantify and read.

In accordance with the invention, it has been found that the length of time during which the discharge takes place may be employed as a measure of spark intensity. The energy stored in the coil does not change from one pulse to the next; thus firing time is a direct measure of the energy dissipated in the spark at a fixed firing voltage. The firing voltage is substantially independent of most factors which could adversely affect system performance. It is independent of differences in spark gap, since the impedance of the gap is small in comparison with the internal impedance of the coil. External sources of dissipation such as cable resistance, leakage paths to ground or coil leakage shorten the duration of the spark, not the voltage at which it occurs. Virtually the only performance factor which affects firing voltage is engine compression, which in the case of inadequate compression decreases the firing voltage, increasing the firing time, since the same amount of energy stored in the coil must be dissipated. Thus leaky valves or gaskets in any cylinder are manifested by an increase in firing time.

Oscillatory Region C in FIG. 1 is indicative of leakage to ground, and is a sensitive indicator of trouble which can be expected to develop into a more serious problem. It is principally affected by leakage in the distributor cap, dust, a leaky rotor, a crack in the coil tower, a short circuit in a coil winding or a short circuit in the condenser, causing a more rapid voltage decay.

In conventional testing, using an oscilloscope, a rough idea of the degree of damping revealed by the oscillations is obtained simply by counting the apparent number of lobes in the trace. In accordance with the invention, a threshold device is interposed between the input signal and the output meter, actuating the meter proportionally to the number of oscillations. The reading does not rely on visually interpreting a trace, and directly displays a value proportional to the average leakage characteristic.

Any one of the above tests reveals certain facts about an ignition system; all three together provide the most complete picture. In a preferred embodiment of the invention, all signals except that from the particular spark plug being tested are excluded by a bistable selector circuit. This is unnecessary for an instrument to be used solely on single cylinder engines. Because of the worn condition of many distributor contacts, the signal received by the spark plug is degraded and noisy. Hence, in a preferred embodiment of the invention, the signal to be tested is obtained from the coil output cable, providing a good signal for test purposes. Since this signal is common to all spark plugs, a signal from the particular spark plug under test is employed to activate a bistable selector circuit for passing only that portion of the coil voltage waveform applicable to the plug under test. Alternatively, a bistable selector circuit may be actuated and the test waveform obtained directly from the spark plug leads, if the signals are not unduly degraded, preferably by a non-ohmic probe which picks up the desired signal upon contact with the cable insulation, avoiding problems associated with disconnecting each plug lead to attach an ohmic probe.

Use of an instrument as disclosed herein permits accurate measurement of specific waveform characteristics not feasible on an automotive oscilloscope because of its trace characteristics. Such instruments additionally read the average of the characteristic being measured, for the particular spark plug, a more satisfactory indicator of performance than an oscilloscope display of successive individual traces. An oscilloscope displays successive plug firings in successive firing order. However, this is not successive cylinder order. The mechanic must then interpret his data to find which cylinder or plug is faulty, an additional inconvenience. In this invention, the selector points physically at the cylinder under test, without ambiguity.

DESCRIPTION OF THE DRAWINGS

Preferred embodiments of the invention will be described in conjunction with the accompanying drawings, in which.

DESCRIPTION OF PREFERRED EMBODIMENTS

Figure 2:
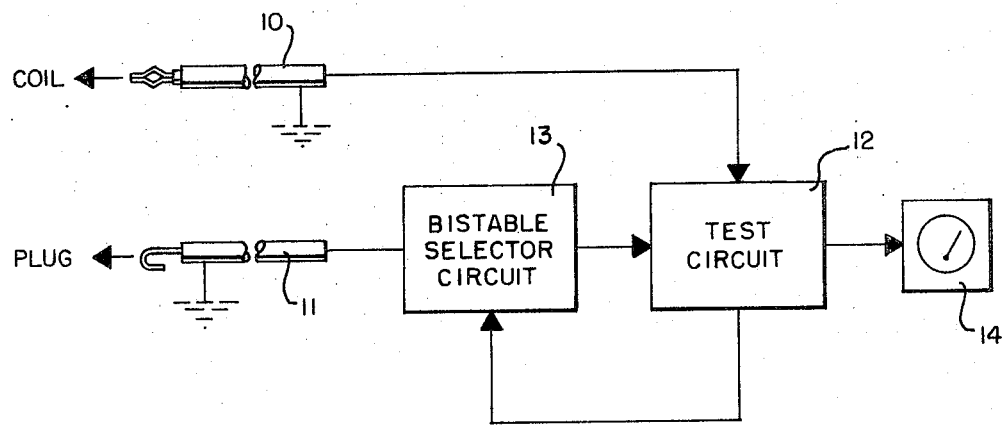
FIG. 2 is a block diagram of a test instrument in accordance with the invention.

FIG. 2 illustrates the basic operation of the instrument. Two probes 10 and 11 for connection respectively to the spark coil and a spark plug terminal are preferably employed. Probe 10 is conveniently an alligator clamp or the like which may be left attached to the coil terminal throughout the test. Both probes are preferably connected to the instrument via shielded cable.

Probe 11 is preferably a non-ohmic probe, which picks up the plug signal electrostatically, making it unnecessary to disconnect and re-connect the probe to test each cylinder. The direct visual correlation of the readout with the plug being contacted makes it unnecessary to know the cylinder firing order or to follow a tangle of leads from distributors to cylinders, as required with certain other test instruments. Electrostatic probe 11 may simply be a short (e.g., ¼ inch) wire protruding from the shielded portion of the cable; preferably it is in the form of a hook, for optimum pickup and signal-to-noise ratio. If convenient, probe 10 may also be an electrostatic probe.

Probe 10 is connected to receive the coil voltage because the waveform received by the plug is ordinarily somewhat degraded due to contact wear or the like. The voltage from probe 10 is fed directly to test circuit 12, which may be any compatible circuit for testing a specified parameter of the waveform of FIG. 1.

In order to actuate test circuit 12 so that it only indicates the value of the tested parameter for a particular spark plug, the plug that it is designed to test is employed to trigger bistable selector circuit 13, through probe 11.

Bistable selector circuit 13, which will be described in greater detail in connection with FIG. 5, functions to actuate test circuit 12 when it is triggered by the leading edge of a spark waveform at the plug under test. After the test circuit has had adequate time to measure the waveform characteristic that it is designed to test, and before the next firing waveform has been received by probe 10, selector circuit 13 de-energizes test circuit 12 so that its indications will not be affected by the subsequent waveform. Only when the next waveform in the firing cycle to the particular plug under test arrives, does selector circuit 13 again actuate the test circuit.

Bistable selector circuit 13 may operate in either of two modes: it may contain an internal timer for determining the least of the actuating pulse supply to the test circuit, or it may employ a feedback signal from the test circuit to turn it off. The output of the test circuit is supplied to a meter 14, the inertial time constant of which is chosen so that it reads the average of the waveform characteristic measured by the test circuit. If desired, as will be explained herein, a plurality of test circuits 12 may be connected through multi-position switches so that any one of them may selectively be switched into the instrument circuit. By this means, indicator 14 may be controlled to read the average of a selected waveform characteristic for a specified spark plug.

Figure 3:
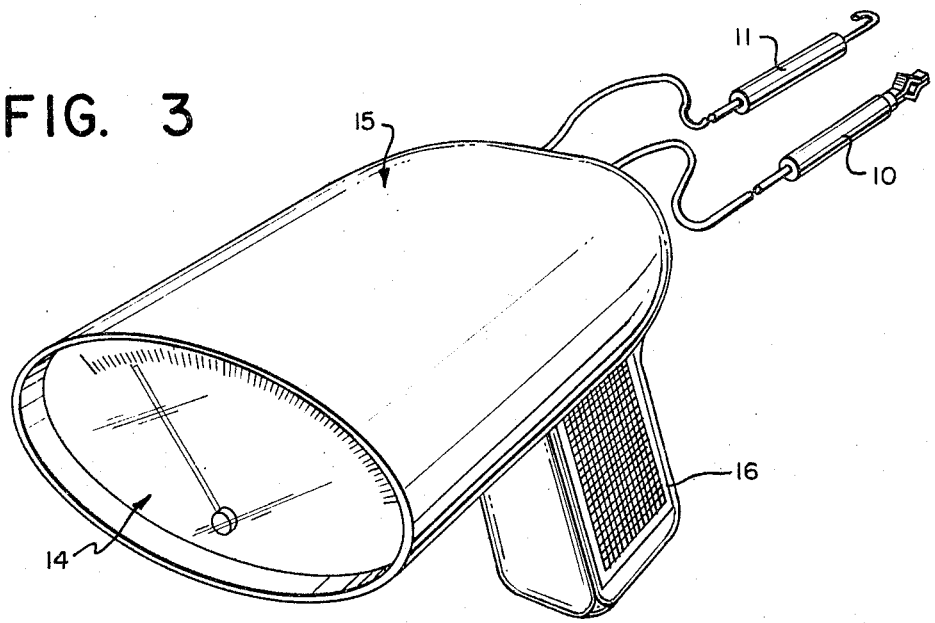
FIG. 3 is a perspective view of a an instrument containing the circuit of FIG. 2.

FIG. 3 is a perspective view of a test instrument employing the circuit of FIG. 2. A housing 15 enclosing the instrument may be formed of metal, plastic, or any other conventionally fabricated material. Preferably, it included a transparent window through which meter 14 may be viewed. The dashed ground symbols in FIG. 2 represent a quasi-ground terminal formed by the handle portion 16 of housing 15, making it unnecessary to additionally ground the instrument ohmically to the engine being tested. A quasi-ground terminal is defined herein as one capable of forming an ohmic or capacitive connection with the operator of the device. A quasi-ground terminal may be a conductive (i.e., metal) portion of housing 15, preferably designed to be grasped by the operator, or it may be formed by using the capacity of the circuit or an extended metallic portion thereof as a capacitative connection. Such extended portion may for example be a sheet of metal foil disposed adjacent the inner surface of the handle portion 16 of a non-conducting housing.

Figure 1:
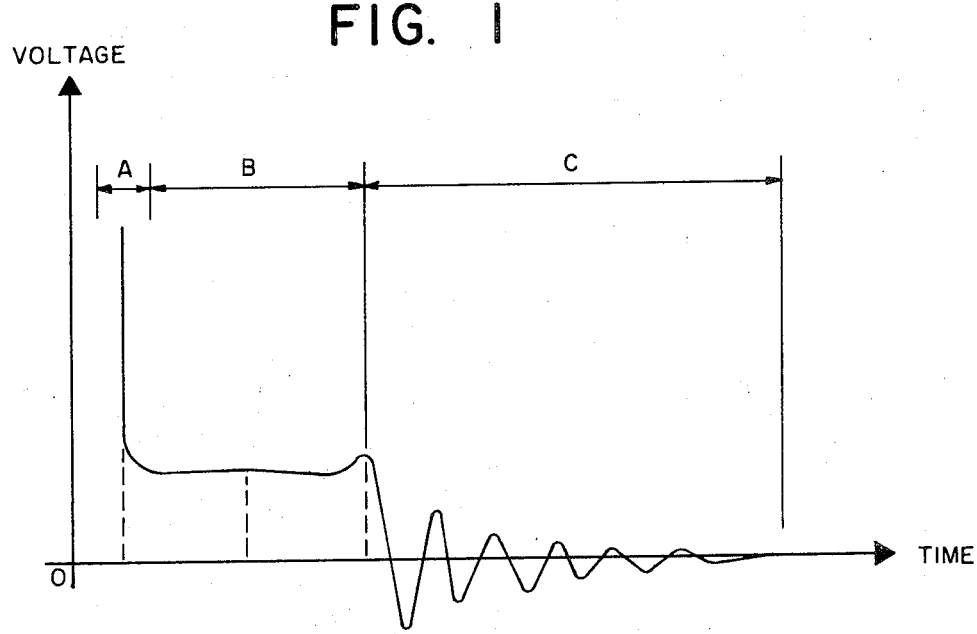
FIG. 1 is a schematic representation of a spark ignition waveform illustrating the peak voltage spark discharge and oscillatory characteristic of the waveform.
Figure 4:
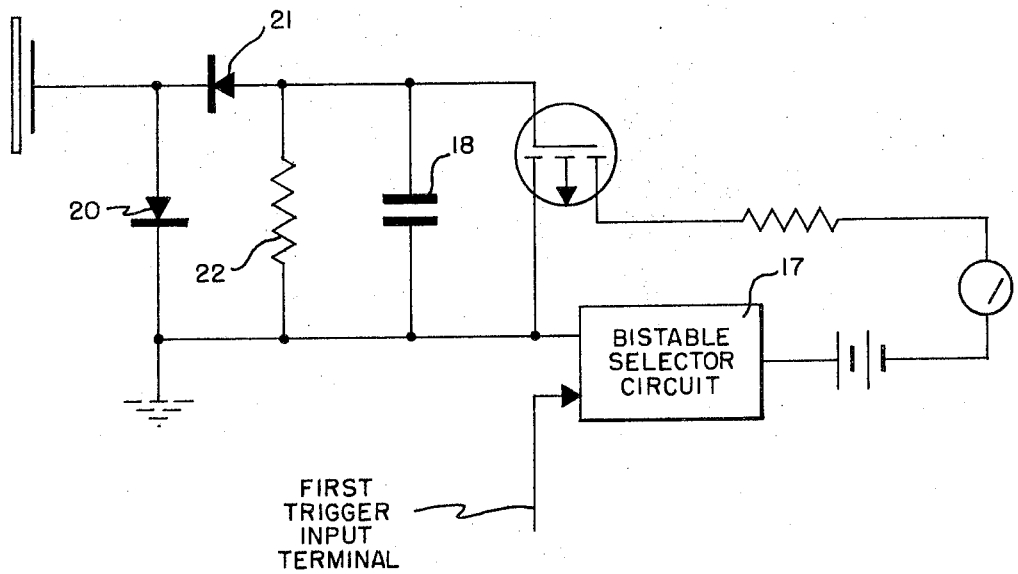
FIG. 4 is a schematic diagram of a measurement instrument in accordance with the invention.

In accordance with preferred embodiments of this invention, test circuits 12 are provided for measuring the respective characteristics of the spark waveform shown as Region A, B, and C in FIG. 1, namely the peak voltage characteristic, the spark discharge characteristic and the oscillatory characteristic. FIG. 4 illustrates an embodiment of the invention in which the test circuit is a peak reading voltmeter for measuring the average firing voltage (recalling that firing voltage has been defined as the voltage required to initiate the spark) of the plug under test.

Additionally, the circuit of FIG. 4 includes a bistable selector circuit 17 for actuating the measurement circuit only when in its SELECT state and for preventing the input signal from registering on the output meter when in its NONSELECT state. The selector circuit will be explained in greater detail in conjunction with FIG. 5.

When actuated by selector circuit 17, the circuit functions by storing on capacitor 18 the peak voltage of a predetermined polarity, according to the arrangement of diodes 20 and 21, which is retained on the capacitor and indicated on the output meter until after bistable circuit 17 turns the power off; the voltage decays through resistor 22 between operating cycles of circuit 17. By choosing appropriate circuit element values in accordance with the speed of the engine being tested and the time constants of the ignition waveform and so that the inertial time constant of the output meter is several times longer than the time between ignition waveforms, the average peak voltage (or equivalently a meter deflection proportional to it) is indicated directly by the output meter.

Test circuits for testing the length of the firing characteristic and the oscillatory characteristic will be described in connection with FIG. 5, which illustrates a preferred embodiment of the invention for testing, in three controllable modes, the three characteristics of the spark waveform indicative of ignition system performance in accordance with the invention, namely the peak voltage, spark intensity, and oscillatory characteristics. In an additional mode, the meter gives a direct reading of engine speed in revolutions per minute for calibrating the instrument to perform the remaining tests.

Figure 5:
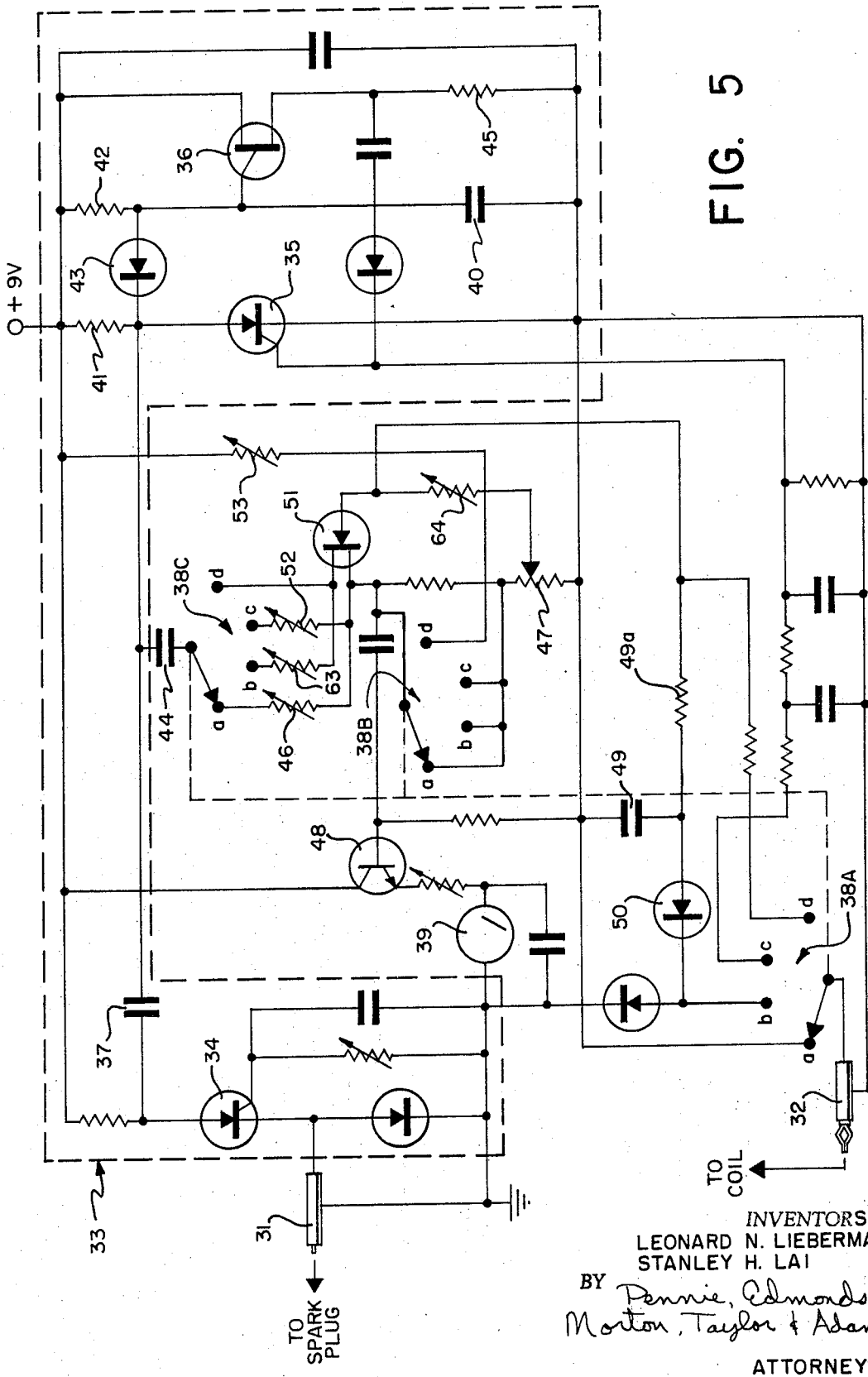
FIG. 5 is a schematic diagram of the alternative embodiment of a measurement instrument in accordance with the invention.

The circuit of FIG. 5 employs two probes 31 and 32 for deriving signals from the ignition system under test. Probe 31 is preferably an electrostatic probe as described above with respect to FIG. 2, completely shielded except for a small insulated metal conductor at the top. The unshielded conductor should be small enough to minimize receipt of stray signals from other spark plugs or noise sources in the ignition system.

Probe 32 is preferably also an electrostatic probe, in the form of an insulated clamp which can be mechanically fastened directly to the coil output cable but without ohmic contact. The clamp is moulded to conform to the cable without damage to the insulation of the latter. There is thus no need to disturb the ignition wiring to make the test.

Probe 31 is connected as a first trigger input to bistable selector circuit 33, which includes S.C.R.'s 34 and 35 and unijunction transistor 36. Prior to actuation, S.C.R. 34 is turned off and S.C.R. 35 is turned on, corresponding to the NONSELECT state of bistable circuit 33. When a spark plug contacted by probe 31 is fired the probe picks up a negative-going pulse corresponding to the "peak voltage" pulse of FIG. 1. Thus the cathode of S.C.R. 34 is driven strongly negative with respect to its gate terminal, turning the S.C.R. on. In the NONSELECT state of circuit 33, the left side (in the schematic representation of FIG. 5) of capacitor 37, connected between the anodes of S.C.R.'s 34 and 35, is normally at a potential of +9 volts, the source voltage, while the right side of capacitor 37 is short circuited to ground through S.C.R. 35.

When circuit 33 is switched to its SELECT state, therefore, the left hand side of capacitor 37 is connected instantaneously to ground, applying a negative potential to the anode of S.C.R. 35, thereby turning it off. The gate terminal S.C.R. 35 serves as a second trigger input to bistable selector 33, and application of a trigger voltage to it returns the circuit to its NONSELECT state. Since different sources of trigger voltage are employed in different operational modes of the instrument, these will be described in the following paragraphs dealing with specific operational modes. The voltage appearing on probe 32, proportional to the coil voltage, is applied to gang 38A of a 3-gang multiposition switch 38, the several gangs of which are indicated as 38A, 38B, and 38C. The respective positions of switch 38 connect the instrument to operate in each of its several modes, for measuring respectively engine RPM, firing voltage, spark intensity and leakage.

RPM MEASUREMENT MODE

In the "RPM measurement" mode, the signal from probe 32 is fed through contact (a) of switch 38A to ground. Bistable selector circuit 33, which for the RPM test may be connected through probe 31 to respond to any spark plug, is employed as a timing circuit to generate a standard timing pulse, the frequency of such timing pulses and hence the quantity indicated by output meter 39 being determined by engine speed, as explained herein.

A described above, firing of a spark plug to which probe 31 is contacted switches bistable circuit 33 to its SELECT state in which S.C.R. 34 is turned on and S.C.R. 35 is turned off. Initially, then, the right side of capacitor 37 is placed momentarily at −9 volts, from which it rises exponentially toward +9 volts, the time constant of such rise being essentially the product of the capacitance of capacitor 37 and the resistance of resistor 41. The time constant $T_1$, of the branch containing capacitor 37 and resistor 41 is made smaller than that $T_2$ of the branch containing capacitor 40 and resistor 42 in order to assure that diode 43 is back biased during the voltage rise. Hence, $T_1$ controls the voltage applied to capacitor 44, while $T_2$ independently determines the voltage at the emitter of uni-junction transistor 36. As long as this emitter voltage is less than a certain voltage determined by the characteristics of the particular transistor and the base 2-base 1 voltage across it, unijunction 36 remains off. As soon as the emitter voltage rises above this value unijunction 36 turns on, rapidly dis-charging capacitor 40 through the small emitter-base 1 resistance and resitor 45, preferably a few hundred ohms. This discharge, which occurs rapidly in comparison with the emitter voltage rise, continues until the emitter voltage drops below the turn-on value, turning unijunction 36 off. When it is turned on, a positive voltage pulse characteristic of the device appears at the base—1 terminal of unijunction 36 returning S.C.R. 35 to its on state. By this time, the voltage across capacitor 37 has reversed in polarity, so that turning on S.C.R. 35 applies a negative pulse to the anode of S.C.R. 34, turning the latter off and thereby returning bistable circuit 33 to its NONSELECT state.

The voltage applied to capacitor 44 approximates a "ramp" so that the current through resistors 46 and 47 and hence the voltage applied from their common node to the base of transistor 48 approximates the above ramp while circuit 33 is in its SELECT state. This voltage is amplified and applied to output meter 39.

The inertial time constant of output meter 39 is long enough in relation to the frequency of pulses applied to it at the engine speed desirable for testing, so that the meter indicates essentially a constant value determined by the fraction of each cycle that selector circuit 33 remains in its SELECT state. The meter may be calibrated directly in terms of engine speed. Preferably, a speed of 500 RPM is used for ignition testing, and this may be determined by switching the instrument to its "RPM" mode as described and adjusting the engine speed until the desired value appears on meter 39. All subsequent tests depend upon the pulsing rate. Hence the RPM must be held at 500 RPM. Alternatively, the meter reading can be adjusted with resistor to simulate 500 RPM for subsequent readings, thus eliminating the need for engine adjustment.

FIRING VOLTAGE MODE

In order to determine the firing voltage, which may be indicative of the operating condition of the spark plug as explained above, gang switch 38 is placed so that its contacts marked "b" are connected in the instrument circuit. In this mode, the signal from the selected spark plug applied to S.C.R. 34 immediately switches selector circuit 33 to its SELECT state; at the same time the voltage obtained through probe 32, proportional to the coil voltage, which essentially follows the spark plug voltage, is applied across capacitor 49 charging it to the peak negative voltage of the applied pulse. Upon reaching the trailing edge of the pulse, diode 50 becomes back biased, leaving on capacitor 49 a fixed portion of the peak, or firing voltage. This voltage is applied to the high impedance gate terminal of F.E.T. 51. Between firing waveforms, the voltage on capacitor 49 decays through resistor 49a; the R-C time constant of the discharge must be small enough to completely discharge the capacitor between waveforms, in order to obtain an accurate measurement. The output of F.E.T. 51 is amplified by transistor 48 and applied to output meter 39. The value of the voltage applied to meter 39 is therefore inversely proportional to the peak or firing voltage stored on capacitor 49. This is desirable for providing an indication compatible with those for the other test modes, for the higher the firing voltage, the poorer the system performance and hence the lower the desired meter indication.

It will be apparent that capacitor 49 will charge to the peak voltage required by each spark plug in the engine in sequence, whereas only the particular spark plug adjacent to probe 31 is desired to be monitored. This is precluded by bistable selector circuit 33, however, which is actuated to its SELECT state by the particular spark plug being monitored and supplied power to F.E.T. 51 only during the waveform corresponding to the spark plug being tested. Only during that cycle is a voltage applied through capacitor 44 to supply power through the source and drain terminals of F.E.T. 51. During all other waveforms, corresponding to the other spark plugs, although the firing voltage of each of them appears at the gate terminal of F.E.T. 51, no output is passed to the base of transistor 48.

As in the RPM measurement mode, bistable circuit 33 reverts to its NONSELECT state at a fixed time after it has been actuated, determined by time constant $T_2$, which time must be shorter than the time between successive firing voltages at the test speed.

SPARK INTENSITY MODE

In order to determine that adequate power is available for and dissipated in the spark discharge, in the spark intensity mode of operation the length of time required for the discharge is measured. With the selector switch 38 adjusted so that terminals "c" are connected in the circuit, the leading edge of the spark plug waveform appearing at probe 31 switches bistable selector circuit 33 to its SELECT state in the manner previously described. The initial negative-going pulse from the coil, applied through probe 32 to terminal "c" of gang switch 38, is ineffective to change the state of S.C.R. 35 but at the end of the discharge, the positive-going pulse applied to terminal "c" fires S.C.R. 35, returning bistable selector circuit 33 to its NONSELECT state. Note that time constant $T_2$ should be chosen so that this turn-off pulse always occurs before turn-off would otherwise occur through operation of unijunction transistor 36.

Since the voltage applied to capacitor 44 rises in the form of a "ramp" function corresponding to time constant $T_1$ during the period in which selector circuit 33 is in its SELECT state, it generates a "ramp" current and hence a "ramp" voltage at the base of transistor amplifier 48 during this time. The "ramp" accentuates a defective spark reading or short-time constant by producing less than proportional power applied to meter 39. The average power per cycle applied to the output meter depends upon the average firing time, and as explained above, spark intensity. Since the output meter 39 responds to average power, by virtue of its ballistic properties, it may be calibrated to read average spark intensity directly.

OSCILLATORY MODE

As indicated in FIG. 1, the ignition circuit oscillates at its natural frequency after the discharge terminates, and these oscillations decay at a rate determined by the intrinsic resistance of the system and any stray resistance introduced through metallic particles, structural faults, or other defects in the system warranting correction. The greater the effect of this stray resistance, the more rapidly the oscillations decay. Hence its rate of decay is indicative of the leakage which exists in the system. This is determined in a leakage test, with the switch 38 adjusted to connect switch terminals 38d in the instrument circuit. In this mode, each time that the spark plug under test is fired, switching selector circuit 33 to its SELECT mode, F.E.T. 51 is biased to cutoff through resistor 53 so that it only responds to positive voltage at its gate terminal. Hence only positive-going pulses of a magnitude sufficient to turn F.E.T. 51 on under these bias conditions cause signals to be transmitted to the base of transistor 48 and hence to output meter 39. These pulses are derived from the coil voltage by a probe 32 through terminals "d" of switch gang 38A. The smaller the deleterious leakage resistance, the greater the area will be under the positive-going portion of the oscillatory waveform; hence the greater the average energy per cycle supplied to the output meter. Selector circuit 33 is returned to its NONSELECT state by the base -1 output pulse from uni-unction transistor 36, as explained above, to screen out all signals other than those from the particular spakr plug under test.

Another way of describing the meter response in the oscillatory test mode is that is responds to the time integral of the positive voltage, a much more accurate reading than a simple count of the number of oscillations, as previously measured from the oscilloscope trace.

In FIG. 3, Meter 39 clearly indicates the results of each test, the needle moving to the right to indicate a good performance and to the left to indicate poor performance. An acceptable performance range is shown indicated on the meter face. A hand-operable trigger switch may be provided conveniently in the housing of the device for supplying power to the measurement circuit. By properly adjusting variable resistors 46, 47, 52, 53, 63, and 64, the output voltage supplied to meter 14 for each test may be adjusted such that the scale accurately indicates the results of all tests without further adjustment.

It will be appreciated by those skilled in the art that various changes and modifications may be made to the above described preferred embodiments without departing from the scope and spirit of the invention as defined by the claims herein.

We claim:

1. A test instrument for an ignition system including spark plugs supplied sequentially with ignition voltage waveforms for causing spark discharges thereat, each such ignition voltage waveform having a peak voltage characteristic, a spark discharge characteristic and an oscillatory characteristic, comprising:
   a bistable selector circuit responsive to signals at first and second trigger terminals for switching respectively to SELECT and NONSELECT states; a probe connected to said first trigger terminal and capable of contacting any selected one of such spark plugs for supplying signals representative of the ignition voltage waveforms at such selected spark plug to actuate the bistable circuit to its SELECT state;
   triggering means connected to the second trigger terminal for switching said selector circuit to its NONSELECT state prior to the next sequential ignition voltage waveform supplied to such spark plugs;
   at least one test circuit responsive to actuation of the selector circuit to its SELECT state for measuring one of said characteristics of ignition voltage waveforms supplied to the selected spark plug said test circuit having an output meter, the time constant of which is substantially longer than the time between ignition voltage waveforms supplied to such selected spark plug, for indicating the average of such characteristic; whereby the average characteristic for any spark plug may be determined by contacting said probe thereto.

2. A test instrument as defined in claim 1 wherein said probe is an electrostatic probe formed of a shielded cable with a short length of unshielded conductor extending therefrom.

3. A test instrument as defined in claim 1 contained in a housing having a handle portion forming a quasi-ground terminal for said instrument when held by a human operator.

4. A test instrument as defined in claim 1 wherein said test circuit measures the peak voltage characteristic of the ignition voltage waveform, said test circuit including capacitive storage means for charging to a voltage proportional to such peak voltage; and amplifying means for supplying a signal representative of said voltage to the output meter; said amplifying means being actuable by the selector circuit when the selector circuit is switched to its SELECT state, whereby the average peak voltage applied to the selected spark plug is indicated by the output meter.

5. A test instrument as defined in claim 1 wherein said test circuit measures the spark discharge characteristic of the ignition voltage waveform, said test circuit including a timing circuit responsive to the ignition voltage waveform for providing timing signals representative of the elapsed time between the peak voltage characteristic and the termination of the spark discharge characteristic of said waveform, said timing circuit being connected to the bistable selector circuit for actuation thereby only when said selector circuit is switched to its SELECT state, whereby the output meter indicates the average spark discharge time for such spark plug.

6. A test instrument as defined in claim 1 wherein said test circuit measures the oscillatory characteristic of such ignition voltage waveform, said test circuit including a threshold device responsive to excursions of a predetermined polarity of the ignition voltage waveform for actuating the output meter proportionally to the time integral of said excursions.

7. A test instrument as defined in claim 1 including a second probe for deriving ignition voltage waveforms from the ignition coil of the ignition system and supplying them to the test circuit, wherein said probe is an electrostatic probe having an unshielded metallic portion of sufficient area to electrostatically derive signals from an adjacent signal source yet small enough in area to preclude interference from other more distant signal sources within the ignition system under test.

8. A test instrument as defined in claim 7 wherein said test circuit measures the peak voltage characteristic of said ignition voltage waveform, said test circuit including capacitive storage means for charging to a voltage proportional to such peak voltage derived by said second probe; and amplifying means for supplying a signal representative of said voltage to the output meter; said amplifying means being actuable by the selector circuit when the selector circuit is switched to its SELECT state, whereby the average peak voltage supplied to the selected spark plug is indicated by the output meter; said triggering means comprising a time delay circuit for switching the selector circuit to its NONSELECT state a predetermined time interval after actuation to its SELECT state.

9. A test instrument as defined in claim 7 wherein said test circuit measures the average spark discharge characteristic of the ignition voltage waveform supplied to the selected spark plug, said test circuit including a timing circuit for providing timing signals representative of the elapsed time between the peak voltage characteristic and the termination of the spark discharge characteristic of said waveform, including second triggering means connected to the second probe for supplying singals therefrom representative of the termination of the spark discharge characteristic in each ignition voltage waveform to said second trigger terminal of the selector circuit for switching the latter to its NONSELECT state.

10. A test instrument as defined in claim 7 wherein said test circuit measures the oscillatory characteristic of such ignition voltage waveform, said circuit including a threshold device connected between the second probe and the output meter responsive to excursions of a predetermined polarity of the ignition voltage waveform for actuating the output meter proportionally to the time integral of said excursions, said threshold device being actuated by the selector circuit when the latter is switched to its SELECT state.

11. A test instrument as defined in claim 8 contained in a housing having a handle portion forming a quasi-ground terminal for said instrument when held by a human operator.

12. A test instrument as defined in claim 9 contained in a housing having a handle portion forming a quasi-ground terminal for said instrument when held by a human operator.

13. A test instrument as defined in claim 10 contained in a housing having a handle portion forming a quasi-ground terminal for said instrument when held by a human operator.

14. A test instrument as defined in claim 11 including a second test circuit for measuring the average spark discharge characteristic and switching means for actuating said second test circuit, said second test circuit including a timing circuit responsive to the ignition voltage waveform for providing to the output meter timing signals representative of the elapsed time between the peak voltage characteristic and the termination of the spark discharge characteristic of said waveform, including means connected to the second probe for supplying signals therefrom representative of the termination of the spark discharge characteristic in each ignition voltage waveform to said second trigger terminal of the selector circuit for switching the latter to its NONSELECT state.

15. A test instrument as defined in claim 14 including a third test circuit capable of being actuated by said switching means to measure the oscillatory characteristic of the ignition voltage waveform, said third circuit including a threshold device connected between the second probe and the output meter and responsive to excursions of a predetermined polarity of the ignition voltage waveform for actuating the output meter proportionally to the time integral of said excursions, said threshold device being actuated by the selector circuit when the latter is switched to its SELECT state.

16. A test instrument for an ignition system including at least one spark plug supplied with ignition voltage waveforms for causing spark discharges thereat, each such ignition voltage waveform having a peak voltage characteristic, a spark discharge characteristic, and an oscillatory characteristic, comprising:

a probe for deriving signals representative of said ignition voltage waveform, first, second and third test circuits, each for measuring one of said ignition voltage waveform characteristics, switching means for selectively connecting the probe to one of said test circuits, and an output meter connectable by said switching means to the selected test circuit;

said first test circuit measuring the peak voltage characteristic and including capacitance storage means for charging to a voltage proportional to such peak voltage, and amplifying means for supplying a signal representative of said voltage to the output meter for displaying thereon the average peak voltage;

said second test circuit measuring the spark discharge characteristic of the ignition voltage waveform and including a timing circuit for providing to the output meter signals proportional to the length of said spark discharge characteristic;

said third test circuit connectable by said switching means to measure the oscillatory characteristic of such ignition voltage waveform, said third test circuit including a threshold device responsive to excursions of a predetermined polarity of the ignition voltage waveform for actuating the output meter proportionally to the time integral of said excursions.

* * * * *